Sept. 15, 1959   L. C. HONEYMAN   2,904,121
FUEL LINE CONTROLLED LOCK
Filed Feb. 12, 1957   2 Sheets-Sheet 1

Lewis C. Honeyman
INVENTOR.

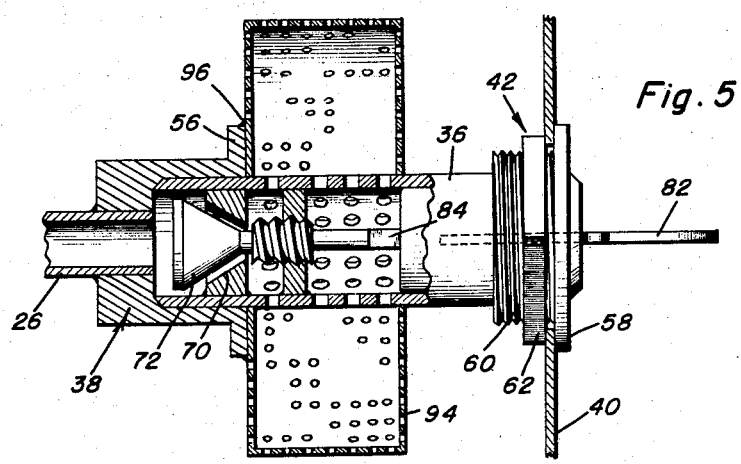

United States Patent Office
2,904,121
Patented Sept. 15, 1959

2,904,121
FUEL LINE CONTROLLED LOCK
Lewis C. Honeyman, Pueblo, Colo.
Application February 12, 1957, Serial No. 639,790
3 Claims. (Cl. 180—82)

This invention relates in general to new and useful improvements in locks for automotive vehicles and more specifically to a fuel line controlled lock.

At the present time vehicles are locked against unauthorized operation through the use of an ignition lock. However, the ignition lock normally has the ignition wires connected to the back of the ignition lock where they may be readily tampered with and crossed by anyone having a slight knowledge of the wiring system of a vehicle. While in the past there have been devised other types of ignition locks which include armored ignition wires, none of these have proved satisfactory, inasmuch as all types of wires may be cut and either connected together to provide the necessary electrical circuit or may be connected to the battery by means of a jumper wire.

It is therefore the primary object of this invention to provide a vehicle lock in the form of a vent line connected to the fuel line, so that when the fuel line is vented, the normal vacuum type pump of the internal combustion engine will not operate to pump fuel.

Another object of this invention is to provide an improved control lock assembly for a vehicle in the form of a vent line which is normally closed and which is provided with a lock control valve which may be locked in an open position so as to vent a fuel line of a vehicle and thereby prevent unauthorized use thereof.

Still another object of this invention is to provide an improved lock control vent line for the fuel line of vehicles, the vent line being provided with a reinforcing member disposed within the interior thereof so as to prevent the closing thereof by use of pliers or the like, thereby preventing tampering with the lock assembly.

A further object of this invention is to provide an improved lock for vehicles, the lock being in the form of a vent line attached to the fuel line of the vehicle and having a valve for controlling the venting action of the vent line, the valve being controlled by a lock and communicating the vent line, when desired, with the atmosphere through openings in a fitting, the openings being provided with a suitable guard to prevent the closing thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is a fragmentary, sectional view similar to Figure 2, showing the valve in an open position and there being illustrated a modified form of shield;

Figure 6 is an enlarged, fragmentary, vertical sectional view showing the details of the connection between the fuel line and the vent line;

Figure 7 is an enlarged, fragmentary, sectional view taken substantially upon the plane indicated by the section line 7—7 of Figure 6;

Figure 8 is an enlarged, exploded, perspective view showing the details of the vent line and the fuel line prior to the connection of the two together; and Figure 9 is a fragmentary, sectional view similar to Figure 5 and shows the details of a slightly modified form of valve.

Figure 1:
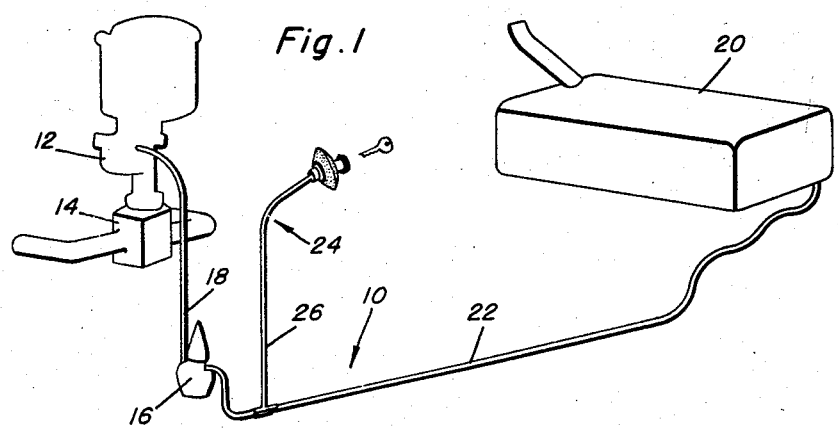
Figure 1 is a schematic view of a fuel system for an internal combustion engine of a vehicle and shows the relative position of the present invention.

Referring now to Figure 1, there is shown schematically the fuel system 10 of an internal combustion engine. The fuel system 10 includes a carburetor 12 which is mounted on an intake manifold 14 and which is connected to a vacuum type pump 16 by means of a pressurized fuel line 18. The vehicle also includes a fuel tank 20 which is connected to the fuel pump 16 by means of a fuel line 22. Inasmuch as the fuel pump 16 is of the vacuum type, fuel within the fuel line 22 is normally under a slight vacuum so as to facilitate the flow thereof from the fuel tank 20 to the pump 16.

Should the fuel line 22 be provided with a vent, in lieu of pumping fuel, the pump 16 will pump air and thus become air bound. It is upon this principle that the present invention operates, and accordingly the fuel line 22 is provided with a vehicle lock assembly 24. The vehicle lock assembly 24 includes a vent line 26.

Referring to Figures 6, 7 and 8, it will be seen that the fuel line 22 is provided with a vent opening 28. The lower end of the vent line 26 is slit to provide two halves 30 which pass along the upper part of the fuel line 22 on opposite sides of the vent opening 28 and which are secured to the fuel line 22 by means of solder 32. It is to be understood that the solder 32 forms a seal between the fuel line 22 and the vent line 26 which is air-tight.

Figure 2:
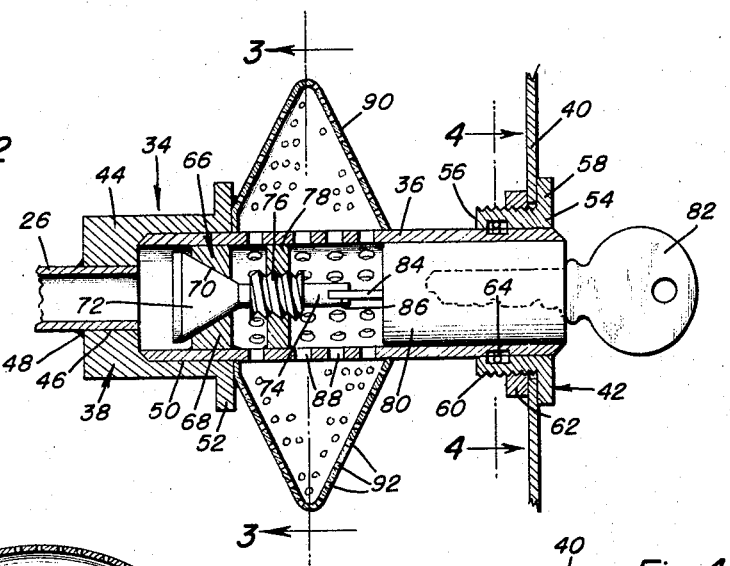
Figure 2 is an enlarged, fragmentary, vertical sectional view taken through the upper end of the vent line and shows the details of the valve and lock of the invention.

As is shown in Figure 2, the opposite end of the vent line 26 is connected to a fitting 34. The fitting 34 includes a short length of pipe 36 which is connected at one end to the vent line 26 by means of an adapter 38 and to an instrument panel 40 of a vehicle at the opposite end thereof by means of an adapter 42.

The adapter 38 includes an enlarged body portion 44. The body portion 44 has provided in one end thereof a bore 46 receiving the upper end of the vent line 26. The vent line 26 is sealed with respect to the adapter 38 by means of solder 48. Aligned with the bore 46 and forming an extension thereof is an enlarged bore 50 opening out through the opposite end of the adapter 38. The pipe 36 has one end thereof seated in the enlarged bore 50 and is sealed to the fitting 38. The end of the body portion 44 remote from the vent line 26 is provided with an annular flange 52.

Figure 4:
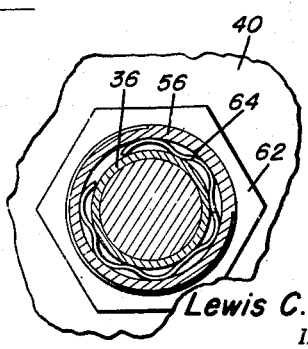
Figure 4 is an enlarged, transverse, sectional view taken substantially upon the plane indicated by the section line 4—4 of Figure 2.

The adapter 42 includes a mounting member 54 formed of a cylindrical body portion 56 having a flange 58 in one end thereof. The body portion 56 is externally threaded, as at 60, and has threadedly engaged thereon a locking ring 62. The locking ring 62 cooperates with the flange 58 to clamp therebetween the instrument panel 40. The body portion 56 is secured to the pipe 36 by means of a locking ring 64 which is best illustrated in Figure 4.

Figure 3:
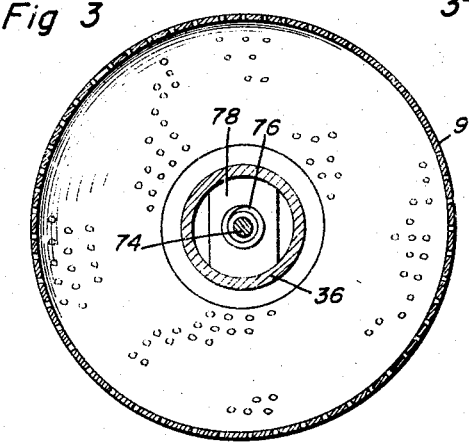
Figure 3 is an enlarged, fragmentary, transverse sectional view taken substantially upon the plane indicated by the section line 3—3 of Figure 2.

As is shown in Figure 2, mounted in that end of the pipe 36 carrying the adapter 38 is a valve assembly 66. The valve assembly 66 includes a partition wall 68 mounted within the pipe 36. The partition wall 68 is provided with a valve seat 70 on which there is normally seated a valve member 72. The valve member 72 is carried by a valve stem 74 which includes an enlarged, externally threaded intermediate portion 76 threadedly engaged in a bar 78 which extends across the pipe 36, as is shown in Figure 3.

Disposed in the end of the pipe 36 remote from the valve assembly 66 is a conventional type of lock 80 which is operated by a key 82. The lock 80 includes an actuator 84 which is rotated through the key 82. The actuator 84 is received in a slot 86 formed in one end of the valve stem 74. It is to be noted that when the key 82 is turned, the valve stem 74 is rotated so as to move the valve member 72 away from the valve seat 70, as is shown in Figure 5. Inasmuch as the pipe 36 is provided with vent openings 88 intermediate the lock 80 and the valve assembly 66, when the valve member 72 is moved to the open position of Figure 5, the vent line 26 is vented to the atmosphere and the fuel pump 16 will only pump air and not fuel.

In order to prevent one from tampering with the present invention and defeat the purpose thereof through the closing of the vent openings 88, there is provided a shield 90. The shield 90 is relatively large and is provided with perforations 92 which are of such a number whereby closing of all of the perforations will be a time-consuming job and therefore discourage any person who would normally tamper with the electrical system of a vehicle.

Referring now to Figure 5 in particular, it will be seen that there is illustrated a slightly modified form of shield 94. The shield 94 differs from the shield 90 only in the outline thereof. The function of the shield 94 will be the same as that of the shield 90. The shield 94 is secured to the flange 52 as by welding 96 in the same manner as is the shield 90.

In order to prevent defeating the purpose of the present invention by tripping and closing the vent line 26, there is disposed within the vent line 26 a reinforcing member 98. The reinforcing member 98, as shown in Figure 7, is of the ribbed type, and should one attempt to close the vent line 26 by squeezing it with pliers, the reinforcing member 98 will prevent collapsing of the vent line 26. The shape of the reinforcing member 98 is such that it is impossible to completely close the vent line 26. The number of ribs on the reinforcing member 98 may be varied as desired.

Referring now to Figure 9, it will be seen that there is illustrated a slightly modified form of valve assembly 100. The valve assembly 100 differs from the valve assembly 66 primarily in that the partition wall 102 thereof is backwards as compared to the partition wall 68, and the valve seat 104 of the partition wall 102 faces towards the lock 80. Also, the valve member 106 carried by the valve stem 74 is shaped oppositely of the valve member 72. Thus, when the valve member 106 is moved to an open position, the valve stem 74 moves to the right, whereas when the valve member 72 is moved to an open position, the valve stem 74 moves to the left. The operation of the valve assembly 100 will be the same as that of the valve assembly 66.

From the foregoing, it will be readily apparent that there has been devised a suitable lock for automotive vehicles which is of such a nature whereby it is practically tamper-proof and at the same time is relatively simple.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lock assembly for an internal combustion engine of the type including a fuel line and a vacuum type fuel pump, said lock assembly comprising a vent line having one end connected to said fuel line in communication therewith, a valve assembly normally closing an opposite end of said vent line, and a lock controlling the actuation of said valve assembly, a reinforcing member disposed within said vent line and preventing collapsing of said vent line by tampering, said reinforcing member having a cross-section dissimilar to the vent line cross-section whereby complete collapsing of said vent line to conform to the configuration of said reinforcing member is virtually impossible.

2. A lock assembly for an internal combustion engine of the type including a fuel line and a vacuum type fuel pump, said lock assembly comprising a vent line having one end connected to said fuel line in communication therewith, a heavy duty fitting mounted on an opposite end of said vent line, a valve assembly positioned in said one end of said fitting, said valve assembly normally closing said opposite end of said vent line, a lock controlling the actuation of said valve assembly, said lock being disposed in the opposite end of said fitting, a vent opening in said fitting intermediate said valve assembly and said lock, a perforated shield extending around said fitting and completely surrounding said vent opening to prevent closing of said vent opening, and a reinforcing member disposed in said vent line, said reinforcing member having a cross-section dissimilar to the vent line cross-section whereby collapsing of said vent line to conform to the exterior configuration of said reinforcing member is virtually impossible.

3. A lock assembly for an internal combustion engine of the type including a fuel line and a vacuum type fuel pump, said lock assembly comprising a vent line having one end connected to said fuel line in communication therewith, a heavy duty fitting mounted on an opposite end of said vent line, a valve assembly normally closing said opposite end of said vent line, a lock controlling the actuation of said valve assembly, said lock being disposed in the opposite end of said fitting, a vent opening in said fitting intermediate said valve assembly and said lock, and a reinforcing member disposed in said vent line, said reinforcing member having a cross-section dissimilar to the vent line cross-section whereby collapsing of said vent line to conform to the exterior configuration of said reinforcing member is virtually impossible.

References Cited in the file of this patent

UNITED STATES PATENTS

| | | |
|---|---|---|
| 1,294,328 | Bowden | Feb. 11, 1919 |
| 1,593,165 | Ferguson et al. | July 20, 1926 |
| 2,638,883 | Simon | May 19, 1953 |